United States Patent [19]

McCormick

[11] Patent Number: 5,110,333
[45] Date of Patent: May 5, 1992

[54] GLASS FIBERIZING BUSHING

[76] Inventor: Ronald O. McCormick, 191 Mainsail Dr., Westerville, Ohio 43081

[21] Appl. No.: 758,547

[22] Filed: Sep. 9, 1991

Related U.S. Application Data

[63] Continuation of Ser. No. 572,465, Aug. 23, 1990, abandoned.

[51] Int. Cl.⁵ .............................................. C03B 37/09
[52] U.S. Cl. ............................................. 65/1; 65/2; 65/12
[58] Field of Search .................................. 65/1, 2, 12

[56] References Cited

U.S. PATENT DOCUMENTS

| | | | |
|---|---|---|---|
| 2,460,547 | 2/1949 | Stevens | 65/1 |
| 2,949,633 | 8/1960 | Drummond et al. | 65/12 |
| 3,134,659 | 5/1964 | Labino . | |
| 3,134,828 | 5/1964 | Labino . | |
| 3,164,458 | 1/1965 | Mitchell | 65/12 |
| 3,623,857 | 11/1971 | McFadden et al. | 65/347 |
| 3,779,730 | 12/1973 | Ramage | 65/9 |
| 3,837,823 | 9/1974 | Shealy | 65/1 |
| 4,363,645 | 12/1982 | Eisenberg | 65/2 |

FOREIGN PATENT DOCUMENTS 632507 12/1961 Canada ............................. 65/1

OTHER PUBLICATIONS

The Manufacturing Technology of Continuous Glass Fibres, Glass Science and Technology K. L. Loewenstein, Published by Elsevier 1983.
Thin Wall Perimeter Bushing, Ronald O. McCormick Oct. 8, 1984.

Primary Examiner—Robert L. Lindsay
Attorney, Agent, or Firm—Brooks & Kushman

[57] ABSTRACT

A bushing assembly 10 through which molten glass 14 is extruded to form fiberglass filaments 12 includes a bushing 22 defining an extrusion face 32. Molten glass flows through the bushing 22 of the extrusion face 32. The extrusion face 32 has a plurality of integrally formed tips 46. The bushing 22 is heated by ceramic heater blocks 42 having resistance heating elements 64 encased in slots 62. A frame 20 holds the bushing assembly 10 including the bushing 22 and heater blocks 42 on an opening 18 of a forehearth 16. Cooling fins 50 and cooling tubes 52 are attached to the bushing assembly to cool the tips 48 and fiberglass filaments 12 after extrusion. Methods of making the bushing and bushing assembly 10 are also disclosed including the steps of hydroforming the bushing 22, punching a plurality of holes 48 in the extrusion face 32, forming tips 48 on each hole and machining the tips 48 to a uniform length. The bushing assembly method also includes the steps of attaching ceramic heater blocks 42 and cooling means (50,52) with the frame 20 into the opening 18 of the forehearth 16.

31 Claims, 5 Drawing Sheets

_Fig-8_

_Fig-9_

_Fig-10_

_Fig-11_

_Fig-12_

_Fig-13_

_Fig-14_

GLASS FIBERIZING BUSHING

This application is a continuation of Ser. No. 572,465, filed Aug. 23, 1990, now abandoned.

TECHNICAL FIELD

This invention relates to the manufacture of fiberglass and more particularly relates to glass fiberizing bushings through which molten glass flows to form filaments that are cooled to make fiberglass.

BACKGROUND ART

A critical step in the art of making fiberglass is fiberizing. In the fiberizing step, molten glass flows from a forehearth to a bushing assembly where it flows through a plurality of orifices. Generally, 200 to 4,000 or more orifices are formed in the bushing plate depending upon the type of product, desired throughput and manufacturing equipment constraints. The orifices are defined by elongated nozzles attached to or formed in the bushing assembly.

A vital function of a bushing assembly is its ability to maintain the glass melt in the bushing above the fiberizing tips at controlled temperature, nominally up to 2150° F. or higher, depending on glass composition appropriate for fiberizing glass. Prior art bushings include rows of fiberizing nozzles arrayed in a series of columns. The nozzles are cooled by circulating water in a series of tubes located near the nozzles or by cooling fins. Ideally, each of the nozzles is kept at the same temperature with no hot spots or cold spots. Hot spots on the bushing can cause uneven flow and fiber breakage. Cold spots on the bushing result in freeze-up and a reduction in bushing throughput efficiency.

In prior art bushings currently in use, electrical current flows through platinum bushing material which functions to properly distribute heat. Prior art bushings must be carefully constructed with the thickness of the bushing walls varying substantially so that current flow can be controlled. Use of a bushing having a standard wall thickness was precluded by the need to provide even heat. Bushings are formed by welding platinum plates of varying thicknesses together depending upon the electrical resistance characteristics of the bushing design and desired thermal characteristics.

Platinum alloy bushings are used because of the temperature resistance characteristics and durability of platinum. Due to the high cost of platinum alloys, it is desireable to minimize the use of platinum alloy in the bushing assembly.

The nozzles are elongated and normally are about 1/16 to ¼ of an inch in length. The elongated nozzles allow the molten glass to cool as it passes through the nozzle. The nozzle extends below the lower surface of the bushing plate to also reduce the tendency of the molten glass to flood along the bottom side of the bushing plate.

The nozzles are generally arranged in a series of rows which span the entire lower surface of the bushing plate. One problem associated with the arrangement of the nozzles in a series of closely spaced rows is that when a fiber break occurs, a bead formed on one nozzle can interfere with the formation of adjacent fibers causing them to break in a chain reaction.

Heat loss through the exposed surface of the bushing is substantial and adds to energy usage costs.

Bushings must be replaced periodically due to wear and heat sag. Heat sag is a term used in the art to refer to the tendency of bushings to sag over time becoming distorted in shape. The nozzles may be welded to holes formed in a fiberizing plate or formed from the plate by extruding or forming operations.

Electrical induction heated bushings are not known to be currently in general use in the industry. Induction bushings previously used were generally round and operated by applying inductive current through the bushing from the outside. Problems encountered with this approach included difficulty in heating control, uneven heating and interference with heating from metal masses. Induction heated bushings required thick platinum alloy walls, and required application of substantial electrical energy. Capacity of these bushings was fairly limited.

A primary object of the present invention is to provide a bushing which has lower platinum alloy requirements per unit of production.

Another primary object of the present invention is to provide a bushing having lower energy usage requirements.

Another object of the present invention is to provide a bushing which uses radiant heat to provide even heat distribution and offers more consistent glass fiber diameter and quality. Ceramic bodies are preferably used to retain the radiant heat from heating elements contained in the ceramic bodies which also insulate the bushing.

An object of the present invention is to provide a bushing which is not adversely affected by heat sag after an extended period of use.

One object of the present invention is to provide a bushing which is easier to manufacture and minimizes the need for welding operations when forming a bushing. The bushing may be formed from a panel having substantially uniform thickness due to the elimination of heating by passing electrical current through the bushing.

A more specific object of the invention is a method of making a fiberizing bushing assembly for attachment to an opening of a forehearth of a glass furnace to manufacture fiberglass. The method comprises the steps of forming a bushing by hydroforming a sheet metal blank to form a depression having an extrusion face; forming a plurality of holes in the extrusion face; forming a tip on each of the holes which extends from one side of the extrusion face; machining the ends of the tips to a uniform length; attaching ceramic blocks having resistance heating elements embedded therein to the lower surface and vertical perimeter portions of the bushing; attaching the bushing and ceramic blocks to the opening of the forehearth with a frame; and, mounting cooling means on the frame adjacent the tips for cooling glass fibers upon exiting the tips.

Another object of the invention is to provide a bushing made by less expensive forming processes to minimize the need for welding and expensive machining operations.

Another more specific object of the invention is to provide a fiberizing bushing assembly for making fiberglass wherein molten glass is heated in a forehearth and supplied through an opening to the fiberizing bushing assembly. The bushing assembly comprises a frame, a bushing having a perimeter flange engaged by the frame to retain the bushing on the opening in the forehearth. An outside wall of the bushing extends downwardly from the flange in a continuous loop having an upper edge contiguous with the flange and a lower edge spaced from the flange. An extrusion face extends substantially parallel to the perimeter flange and inwardly from the outside wall at the lower edge of the outside wall to an inner edge. A base wall extends between and interconnects the area between the inner edges of the extrusion face. One or more heater blocks are secured to the bushing for heating the outside wall and the base wall to maintain the temperature of molten glass within the bushing at the desired fiberizing temperature. A plurality of tips are formed in the extrusion face of the bushing through which molten glass is drawn to form continuous glass fibers or filaments. The tips each define a hole through the extrusion face and extend slightly below the extrusion face. Preferably, cooling tubes or fins are located adjacent the extrusion face for cooling the glass filaments upon existing the tips.

These and other problems are overcome and objects are obtained by the glass fiberizing bushing of the present invention and the method of making such a bushing as will be summarized below.

DISCLOSURE OF INVENTION

The present invention relates to a fiberizing bushing assembly for making fiberglass by heating molten glass in a forehearth which is supplied through an opening in the forehearth to the fiberizing bushing assembly. The fiberizing bushing assembly includes a frame for retaining a bushing assembly on the opening. The bushing is uniquely formed and includes a perimeter flange which extends outwardly from an outside wall portion. The outside wall extends downwardly from the flange as a continuous wall. The outside wall has an upper edge contiguous with the flange and a lower edge which is spaced from the flange. An extrusion face extends inwardly from the outside wall at the lower edge of the outside wall. The bushing includes a base wall which extends between and may interconnect the area between the inner edges of the extrusion face. Heater block means are secured to the lower surface of the bushing to heat the outside wall, extrusion face and base wall maintaining it at the proper temperature for fiberizing glass. A plurality of tips are formed in the extrusion face of the bushing. The tips each define a hole through the extrusion face and extend slightly below the extrusion face.

Cooling means are preferably located adjacent the extrusion face for cooling the glass meniscus to form filaments upon exiting the tips. Alternatively, the cooling means may be water cooled tubes, fins or air flow about the tips.

According to another aspect of the present invention, the outside wall, extrusion face and base wall of the bushing each have two substantially semi-circular ends and two substantially straight sides to form an oval or racetrack-shaped extrusion face. Alternatively, the extrusion face can be round, hourglass-shaped or straight instead of oval. An inner wall is preferably provided which extends vertically between the inner edge of the extrusion face and the base wall.

The outside wall, extrusion face, inner wall and base wall are advantageously formed in the bushing from a platinum alloy sheet metal blank initially having a substantially uniform thickness by a hydro-forming operation.

The heater block means are preferably formed as a plurality of modules held in place by the frame. The modules are each ceramic members formed with slots having resistance heating elements that are encapsulated by ceramic filler material. The modules include at least one inner module and more than one outer module which are preferably separately serviceable and individually temperature controlled. The inner module is heated by oval loop-shaped heating elements.

Other features of the invention are that the base wall has a raised center sloping downwardly toward the inner wall. Also, the holes in the tips may be either circular or oval in shape.

The cooling means preferably include metal fins attached to the frame which are adjacent to the extrusion face. The cooling means also preferably include tubes for recirculating water secured to each of the fins.

A method of making a fiberizing bushing for making fiberglass of the present invention comprises steps of hydroforming a sheet metal blank to form a depression having an extrusion face. A plurality of holes are punched in the extrusion face and a tip is formed on each of the holes to extend from the lower surface of the extrusion face. The tips are then finished by machining the ends of the tips to a uniform length. The punching and forming operations are preferably performed in a single operation. A single punch may be used or preferably a gang punch will be used to form many holes simultaneously. The machining step is preferably performed by electrical discharge machining.

The hydroforming step of the present invention is generally performed on a platinum alloy sheet metal blank. The blank is drawn preferably into an oval-shape and includes a depression having an outside wall, the extrusion face, an inner wall and a base wall. The base wall may have a sloping surface to improve glass flow characteristics. It is anticipated that the base wall could be essentially planar and non-sloping, and that the inner wall could be eliminated.

Another aspect of the present invention relates to a method of making a fiberizing bushing assembly for attachment to an opening of a forehearth of a glass furnace for manufacturing fiberglass. The method of making a fiberizing bushing assembly includes the steps of forming a bushing by hydroforming a sheet metal blank of uniform thickness to form a bushing having an extrusion face, punching a plurality of holes in the extrusion face and forming a tip on each of the holes which extends from one side of the extrusion face. The tips are then machined to a uniform length. Ceramic blocks are attached to the lower surface of the bushing. The bushing and ceramic blocks are attached over an opening in the forehearth by a frame. Cooling means are mounted on the frame adjacent the tips to cool the glass fibers as they exit the tips. A seal ring comprising cooling means is preferably located between the forehearth orifice opening and the bushing to seal off any glass leakage around the bushing.

DETAILED DESCRIPTION

Figure 1:
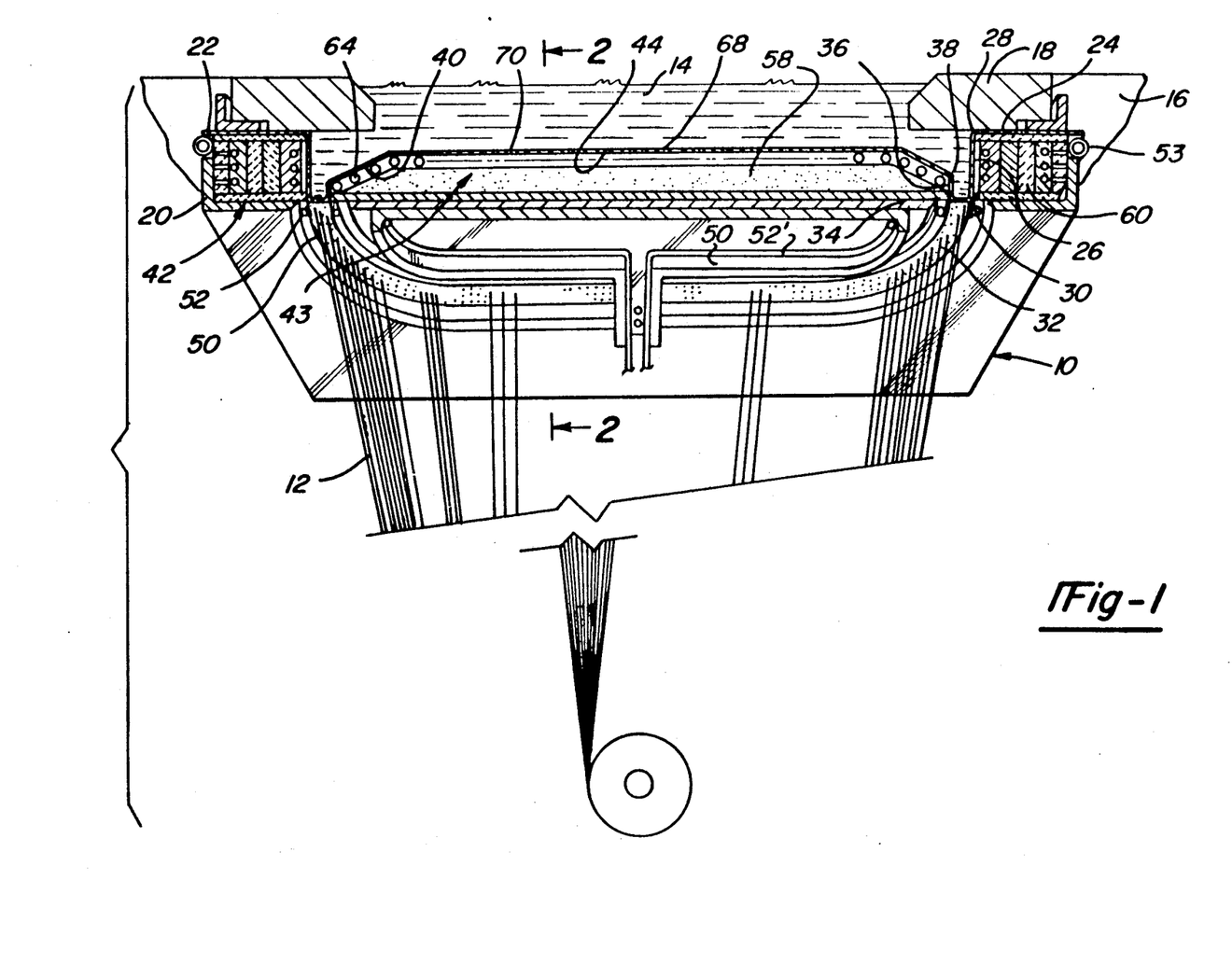
FIG. 1 is a perspective view partially in cross-section of the fiberizing bushing assembly made according to the present invention secured to an opening in a forehearth.
Figures 2, 3:
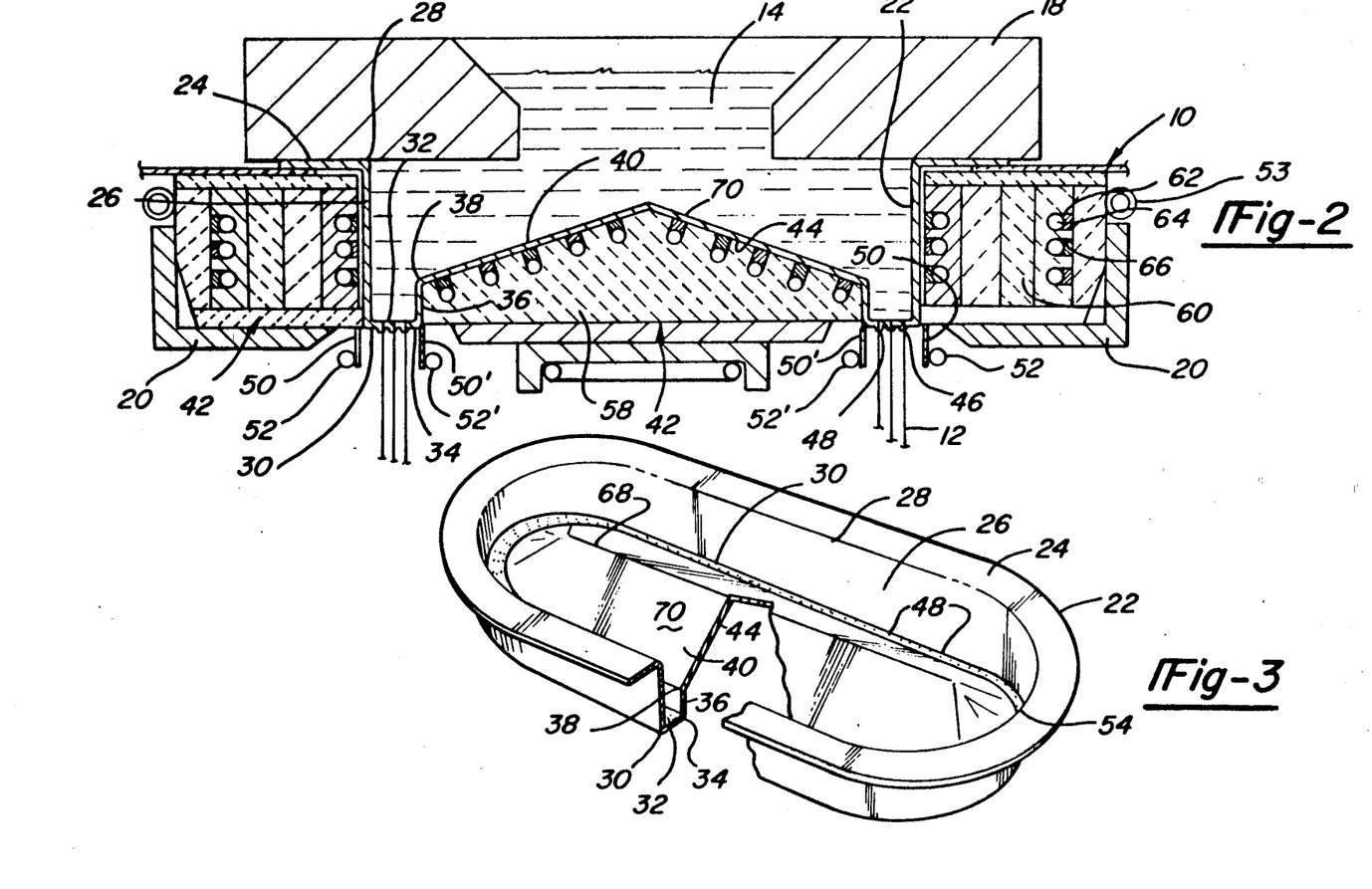
FIG. 2 is a cross-sectional view taken along the line 2—2 in FIG. 1.
FIG. 3 is a perspective view of a preferred bushing partially broken away to show the contour thereof.

Referring now to FIGS. 1 through 3, the fiberizing bushing assembly is generally indicated by the reference numeral 10. Fiberglass filaments 12 are formed from molten glass 14 contained within the forehearth 16 located above the bushing assembly 10. Molten glass 14 flows from the forehearth 16 by gravity through an opening 18 to the bushing assembly 10.

The bushing assembly 10 includes a frame 20 formed of structural steel or the like which secures the bushing assembly on the opening 18. Bushing assembly 10 features a bushing 22.

Bushing 22 is preferably formed from a platinum alloy sheet metal blank. The bushing is formed into an annular funnel-like configuration by a sheet metal hydroforming operation. A perimeter flange 24 extends substantially in a horizontal plane and is adapted to be clamped against the bottom of the opening 18 in the forehearth 16 by the frame 20.

The bushing 22 includes an outside wall 26 which is formed as a continuous wall extending in an oval, or racetrack path, substantially perpendicular to the perimeter flange 24. The outside wall extends downwardly from the perimeter flange 24 and when installed across the opening 18, the outside wall 26 extends away from the opening 18. The outside wall 26 and perimeter flange 24 meet at an upper edge 28 of the outside wall 26. The outside wall 26 includes a lower edge 30 where the outside wall 26 meets an extrusion face 32.

The extrusion face 32 lies substantially in a plane parallel to the plane of the perimeter flange 24. The extrusion face 32 is a relatively narrow band formed on the bushing 22. The extrusion face 32 extends inwardly from the outside wall 26 to an inner edge 34.

An inner wall 36 extends upwardly from the inner edge 34 of the extrusion face 32 to an interior upper edge 38. Interior upper edge 38 is formed at the intersection of the inner wall 36 and a base wall 40 which is generally oval-shaped and spans the interior of the oval inner wall 36.

As used herein, the term "oval" describes a racetrack-shaped member wherein semi-circular ends 54 are interconnected by straight sides 56. The extrusion face 32 is preferably of oval-shape as well as the outside wall 26 and the inner wall 36. Alternatively, the shape of the extrusion face of the bushing shell can be round, hourglass-shaped, or a straight band.

Heater blocks generally indicated by the reference numeral 42 are modular ceramic members including means for heating the bushing 22 which are secured to the bottom surface 44 of the bushing 22. The heater blocks 42 function to heat the bushing 22 to control the temperature of the molten glass 44 after it is supplied to the bushing assembly 10. The ceramic material used to form the heater blocks 42 is preferably an alumina fiber insulating material having low thermal conductivity. The use of the ceramic heater block is a significant departure from prior art practice since there is no current passed through the bushing for heating the glass adjacent the bushing. Instead, heat is radiated through the bushing to the glass inside the bushing by the ceramic heater blocks 42. The heat from the ceramic blocks 42 radiates from an external source. The heat is preferably an electric radiant heat source, however, is conceivable that a gas burner heat source could also be used.

As used herein, radiant heating should be understood as including additional or alternative conduction heating. The base wall heater block heats more by conduction than by radiation. The outside heaters heat primarily by radiant heating, but may also rely at least in part on conduction heating. Whether by radiation or conduction, an important aspect is the thermal energy transfer to the bushing by external sources, as opposed to the direct or internal $I^2R$ heating of conventional bushings.

Referring now to FIGS. 2 and 4 through 6, the process of forming tips 46 in the extrusion face 32 will be described. The tips 46 define a hole 48 through which molten glass 44 is extruded to form fiberglass filaments 12. The tips 46 are preferably cylindrical in shape, however, oval-shaped tips defining an oval-shaped hole may offer advantages and improve melt rate capacities as compared to circular holes. The tips 46 project downwardly from the extrusion face 32. The projection of the tip 46 is referred to as separation projection and is intended to insure that glass does not wet over the surface of the extrusion face 32.

The tips 46 may theoretically be arranged in a single row, however, a multiple row of tips is expected to be more economical and practical. The extrusion face functions as a cooling surface since heat is lost through the extrusion face 32 as the glass progresses toward the tips. Cooling continues through the length of the tips. Glass is heated in the bushing by the ceramic heater blocks 42, and must be maintained at the critical temperature until it is just above the extrusion face 32 and the tips 46. The extrusion face causes some cooling which increases the viscosity of the glass in the melt. Cooling continues as the glass progresses to and through the tips 46. No energy flows directly through the base wall of the extrusion face 32, consequently, it forms part of the cooling system. Cooling causes the viscosity of the glass melt to increase, and eventually causes the melted glass to fiberize.

Referring now to FIGS. 1 and 2, cooling means are generally required to cool the meniscus formed on the tips 46. Cooling fins 50 may be provided adjacent the tips 46 and may be supplemented by cooling tubes 52 through which water is recirculated to remove heat from the bushing assembly 10. The cooling tubes and fins may be built into or attached to the frame 20.

A seal ring 53 is provided about the perimeter of the bushing shell to cool any glass tending to seep between the opening and the perimeter flange of the bushing shell. The seal ring causes the glass to cool and solidify, resulting in a seal between the bushing and the opening.

The heater blocks 42 are preferably modular in construction. An inner module 58 engages the base wall 40 and inner wall 36. One or more outer modules 60 contact the outside wall 26 and perimeter flange 24. One outer module 60 may be associated with each of the semi-circular ends 54 and each of the straight sides 56 to permit localized heating control. The power supplied to the inner module 58 and outer modules 60 is controlled to maintain the temperature of the molten glass between 2150° and 2200° required for fiberizing various glass compositions.

The modules are initially formed with slots 62 which extend about the modules 58 and 60 in loops. Resistance heater elements 64 are located within the slots 62 at spacing determined by the heat distribution requirements of various zones of the bushing assembly 10. The resistance heater elements 64 are encapsulated by ceramic filler material 66 which protects the resistance heater element 64 from volatilization and also aids in distributing heat through the heater blocks 42.

As shown in FIGS. 1, 2 and 3, the base wall 40 has a raised center ridge 68 and a sloping top surface 70 which extends from the raised center 68 to the interior upper edge 38 of the inner wall 36. The sloping top surface 70 facilitates flow of the molten glass 14 outwardly from the opening 18 to the extrusion face 32 with a minimum of flow restriction.

Figure 7:
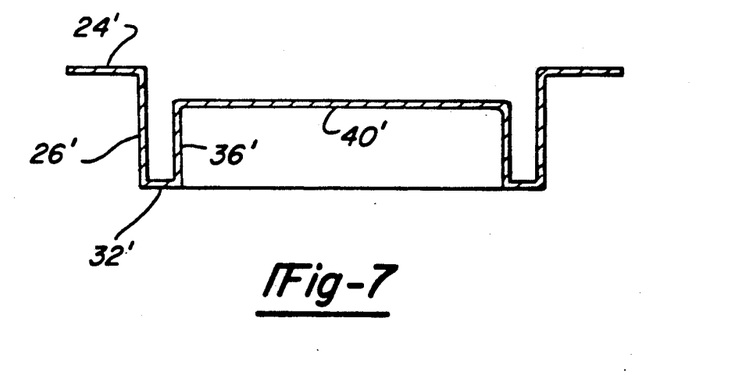
FIG. 7 is a cross-sectional view of an alternative design of a bushing according to the present invention.

In an alternative embodiment, as shown in FIG. 7, the base wall 40' is flat. In this alternative, a perimeter flange 24', outside wall 26', extrusion face 32' and inner wall 36' are provided.

The method of forming the fiberizing bushing 22 of the present invention will next be described with reference to the drawings and in particular with reference to FIGS. 3 through 6.

Figure 4:
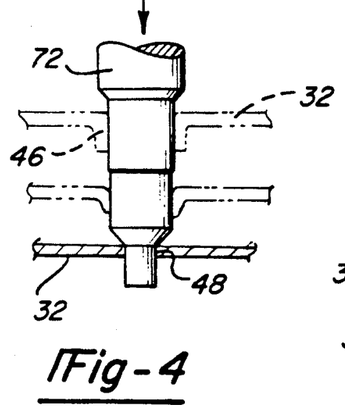
FIG. 4 is a fragmentary side-elevational view of a punch used in manufacturing a bushing according to the present invention with progressive steps for forming tips shown in phantom lines.
Figure 5:
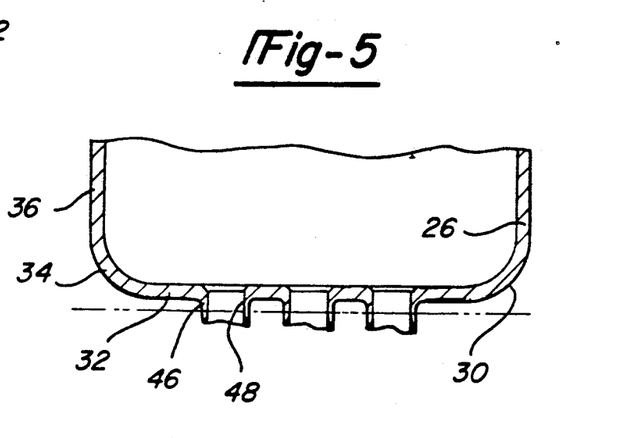
FIG. 5 is a fragmentary cross-sectional view showing the rough tips formed by punching according to the present invention.

The general shape of the bushing 22 is shown in FIG. 3. The bushing can be formed by a sheet metal forming operation, wherein sheet metal is clamped and formed into the shape shown in FIG. 3. As shown in FIG. 4, a punch 72 is used to form holes 48 and ultimately tips 46 in the extrusion face 32. The punch forming segment forms a hole in the extrusion face as shown in solid lines in FIG. 4. The punch then continues through the hole until the edges of the hole are contacted and deformed downwardly by the forming tip, as shown in the lower phantom lines in FIG. 4. A sizing tip and counterbore shoulder is formed on the punch to bevel the lead-in to the tip 46, as shown in the upper phantom lines in FIG. 4. The punch is then retracted. A large number of holes are formed in the extrusion face 32 by the use of one or preferably many punches simultaneously. As presently conceived, as many as 3,200 openings would be formed in the extrusion face. The size of the openings are preferably between 0.030 and 0.050 inches in diameter.

Figure 6:
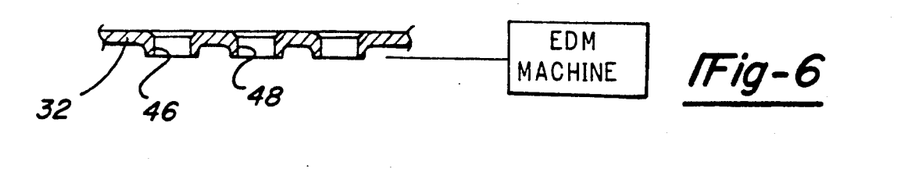
FIG. 6 is a fragmentary cross-sectional view showing the tips after machining according to the present invention.

As shown in FIG. 6, after all of the holes have been punched and tips roughly formed, the tips are preferably cutoff by an EDM machine at a standardized length of between 0.015 and 0.030" in diameter. The length of the tips is determined by the need to prevent flooding of the extrusion plate wherein molten glass flows across the base of the bushing between adjacent tips. An alternative method for forming the tips would be to use an EDM machine to shape the tip. The alternative method may also include electrochemical or chemical deposition techniques to form short tips.

The water cooled cooling fins 50 cool the glass meniscus formed at the exit of the tips. Cooling fins 50 are preferably provided adjacent the outboard side of the extrusion face. As shown in FIGS. 1 and 2, an interior cooling fin 50' and cooling tube 52' could be provided between the inner module 58 and the extrusion face 32.

The fiberizing bushing formed according to the above method is assembled to form a complete fiberizing bushing assembly. The completed assembly attached to the opening 18 of a forehearth of a glass furnace. The fiberizing bushing assembly is completed after forming the bushing 22 by assembling ceramic heater blocks 42 to the lower surface of the bushing. The ceramic blocks and bushing are secured to the opening in the forehearth by the frame 20. Cooling means are then mounted on the frame adjacent to the meniscus formed at the tips 46 to cool glass fibers 12 upon exiting the tips thereby causing the fiberglass filaments 12 to solidify. Alternatively, the cooling means could be forced air that would replace or supplement the water cooling tubes.

Figure 8:
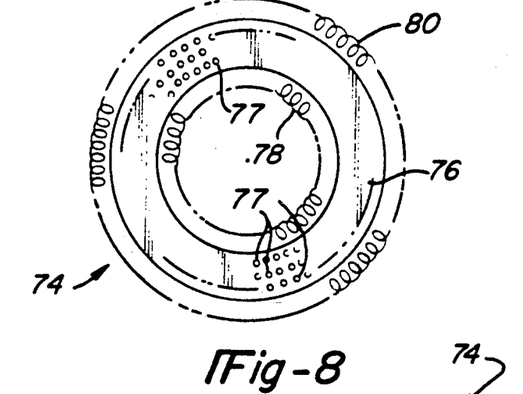
FIG. 8 is a bottom plan view of an alternative design of a fiberizing bushing assembly made according to the present invention.
Figure 9:
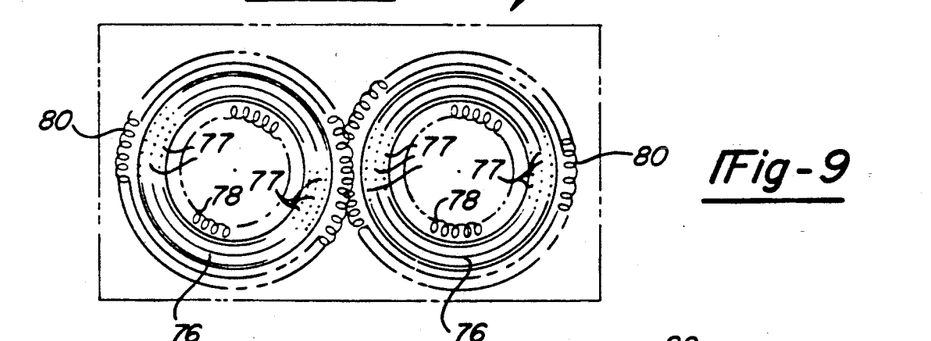
FIG. 9 is a bottom plan view of an alternative design of a fiberizing bushing assembly made according to the present invention.

Referring now to FIGS. 8 and 9, an alternative embodiment of the present invention is shown wherein a circular bushing is provided with a single circular bushing being shown in FIG. 8, and a double circular bushing 74 being shown in FIG. 9. The use of a circular bushing may provide advantages in that more even heating can be achieved about the perimeter of the bushing as compared to an oval or racetrack-shape. The circular bushing 74 would include one or more circular extrusion faces 76. Tips 77 are formed on the extrusion face 76. Inner and outer heater blocks 78 and 80 would function to heat by radiant heating the glass melt within the circular bushing 74 as previously described.

Figure 10:
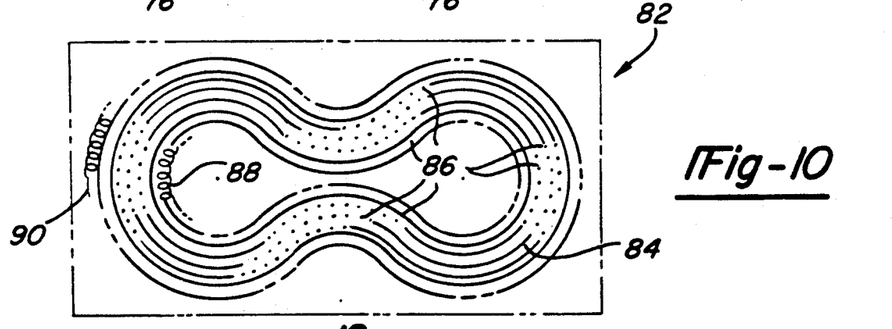
FIG. 10 is a bottom plan view of an alternative design of a fiberizing bushing assembly made according to the present invention.

Referring now to FIG. 10, an hourglass-shaped bushing 82 is shown as made in accordance with the present invention. The bushing 82 has an extrusion face 84 having an hourglass configuration. Tips 86 are formed on the extrusion face 84 as previously described with regard to the other embodiments of the invention, and inner and outer heater blocks 88 and 90 would be provided to heat the molten glass within the bushing 82 by radiant heating.

Figure 11:
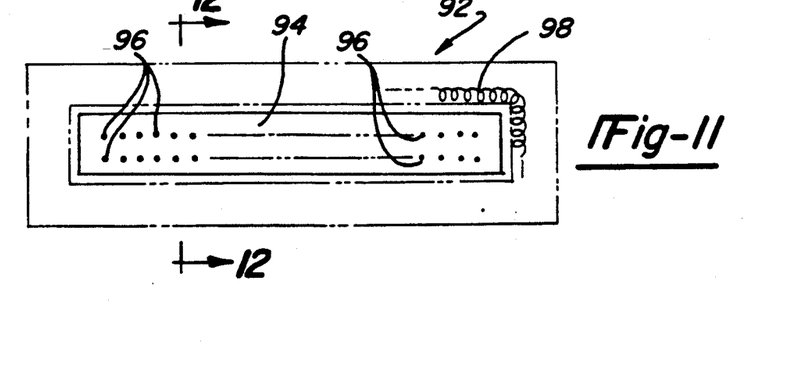
FIG. 11 is a bottom plan view of an alternative design of a fiberizing bushing assembly made according to the present invention.
Figure 12:
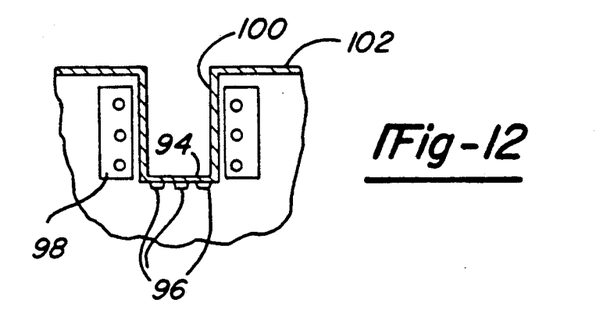
FIG. 12 is a cross-sectional view taken along the line 12—12 in FIG. 11.

Referring now to FIGS. 11 and 12, a linear band bushing 92 is shown which features an extrusion face 94 comprising a linear band. A plurality of tips 96 are formed on the extrusion face 94. An outer heater block 98 would be provided about the extrusion face 94 for heating molten glass by radiant heating within the bushing 92. The outer heater block 98 would radiate heat through the side walls 100 of the bushing 92. As shown in FIG. 12, a perimeter flange 102 would be provided on the bushing and mounted to the opening in the forehearth as previously described.

Figure 13:
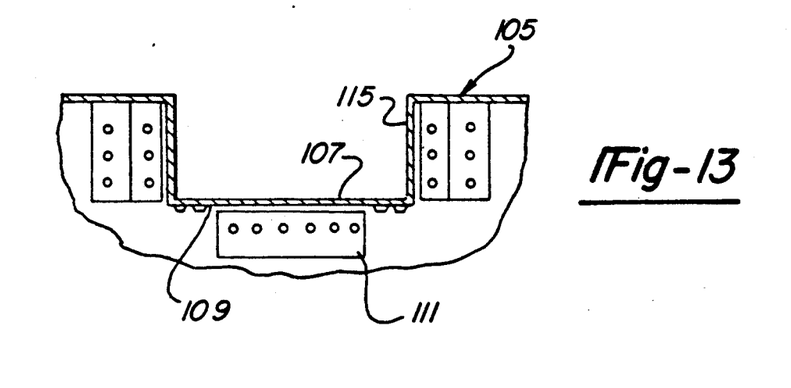
FIG. 13 is a cross-sectional view of an alternative design of a bushing according to the present invention.

Referring now to FIG. 13, a planar base wall embodiment 105 is shown in cross-section. The planar base wall embodiment could be adapted to any of the above-described shapes without departing from the invention. The planar base wall embodiment 105 includes a base wall 107 which may be contiguous with the extrusion face 109. The base wall 107 can be planar and extend in the same plane of the extrusion face 109, as shown, or could be shaped to modify glass flow passed through the bushing. A base wall heater block 111 is secured to the bushing 105 on the outside of the base wall 107. The base wall heater block 111 heats primarily by conduction and to a lesser extent by radiant heat. An outer wall heater block 113 is connected to the outer wall 115 of the bushing 105 so that heat may be radiated through the outer wall 115 by the heater block 113.

Figure 14:
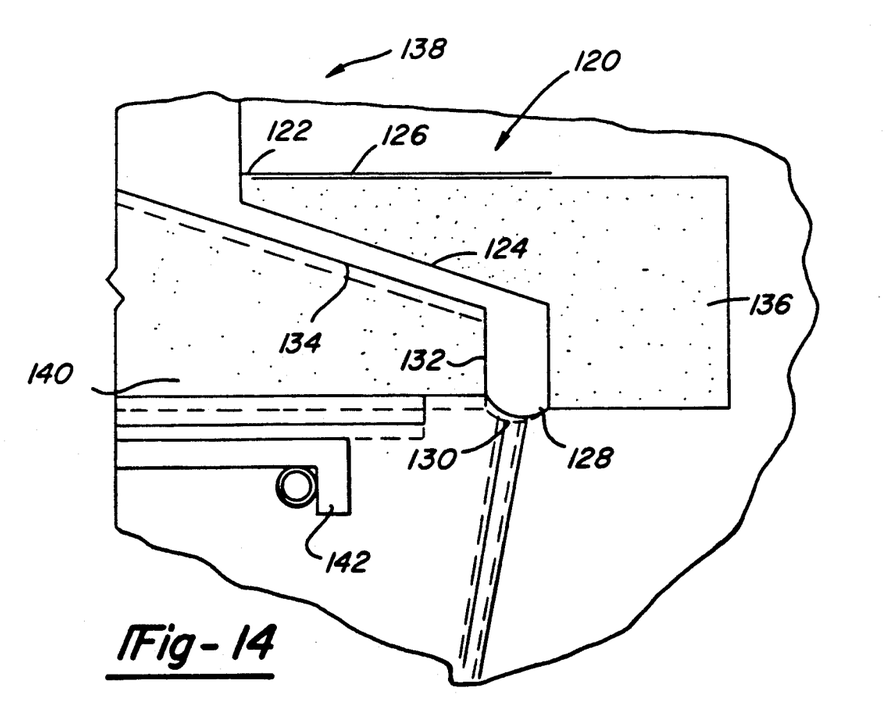
FIG. 14 is a fragmentary cross-sectional view of an alternative design of a fiberizing bushing assembly made according to the present invention.

Referring now to FIG. 14, an alternative embodiment of the present invention is shown wherein a bushing 120 having controllable glass flow paths is shown. The bushing 120 would include a bushing 122 having an outer wall 124 extending downwardly from a perimeter flange 126 to an extrusion face 128. Extrusion face 128 would include a plurality of tips 130, an inner wall 132 would extend between the extrusion face 128 and a base wall 134 of the bushing. A portion of the outer wall 124 and the base wall 134, as shown in FIG. 14, are parallel to each other, and at least partially vertically spaced from each other. An outer heater block 136 would be stationarily mounted on an opening 138 in the glass forehearth, and an inner heater block 140 would be mounted to the base wall 134 of the bushing 122. The inner heater block 140 is mounted on a vertical displacement means so that the distance between the outer wall 124 and the base wall 134 may be varied to control glass flow from the forehearth through the opening 138 to the extrusion face 128. In this way, the melt rate of the bushing can be controlled by mechanical adjustment with the extrusion face 128 being pliable to permit the vertical displacement. An example of a vertical displacement means that would be useful would be a jackscrew-type device connected to the inner heater block or the frame 142 of the bushing.

The above description is provided by way of example of the best mode currently known of practicing the invention. It is anticipated that other modifications and variations in the apparatus and method of the present invention are possible within the scope of the following claims.

I claim:

1. A fiberizing bushing assembly for making fiberglass wherein molten glass is heated in a forehearth and supplied through an opening to the fiberizing bushing assembly comprising:
   a frame;
   a bushing retained by said frame on the opening of the forehearth, said bushing having an outside wall extending downwardly and away from the opening in a continuous loop having a lower edge spaced from the opening, an extrusion face spaced from the opening and extending inwardly from the outside wall at the lower edge of the outside wall to an inner edge and a base wall extending between and interconnecting the inner edge of the extrusion face;
   heater block means adjacent to the bushing for radiantly and conductively heating the outside wall and the base wall to maintain the temperature of molten glass within the bushing at the desired temperature for fiberizing, said heater block means comprising ceramic members having resistance heating elements disposed therein, said heater block means further comprising an inner module for heating said base wall and an outer module for heating said outside wall;
   a plurality of tips formed in the extrusion face of the bushing through which molten glass is drawn to form glass filaments, said tips each defining a hole through said extrusion face and extending slightly below said extrusion face; and
   cooling means for cooling the glass filaments upon exiting said tips.

2. The fiberizing bushing assembly of claim 1 wherein said bushing has a perimeter flange which is adapted to be engaged by said frame, said wall extending from said perimeter flange at the upper edge of the wall.

3. The fiberizing bushing assembly of claim 1 wherein said bushing has an inner wall contiguous with the inner edge of the extrusion face and extending upwardly from said extrusion face to an interior upper edge and said base wall interconnects the interior upper edges of the inner wall.

4. The fiberizing bushing assembly of claim 3 wherein said outside wall, said extrusion face, said inner wall, said base wall of said bushing each have two substantially semi-circular ends and two substantially straight sides.

5. The fiberizing bushing assembly of claim 3 wherein said outside wall, said extrusion face, said inner wall, and said base wall are formed with a substantially uniform thickness from a single sheet of metal.

6. The fiberizing bushing assembly of claim 1 wherein said ceramic members are held in place by said frame, said ceramic members having slots formed therein in which resistance heating elements are disposed, said heater elements being encapsulated in said slots by ceramic filler material.

7. The fiberizing bushing assembly of claim 6 wherein said ceramic members are separately serviceable and individually temperature controlled.

8. The fiberizing bushing assembly of claim 7 wherein said outer module is an oval shaped member having a plurality of heating elements extending substantially completely around the outer module in an oval path, said heating elements being arrayed in a vertically spaced relationship.

9. The fiberizing bushing assembly of claim 7 wherein said inner module has a top surface having a raised center, said top surface sloping downwardly toward an inner wall, and said inner module having a series of heating elements formed as substantially oval loops which are non-intersecting and are progressively larger.

10. The fiberizing bushing assembly of claim 1 wherein said tips have a circular hole.

11. A fiberizing bushing assembly for making fiberglass wherein molten glass is heated in a forehearth and supplied through an opening to the fiberizing bushing assembly comprising:
   a frame;
   a bushing retained by said frame on the opening of the forehearth, said bushing having an outside wall extending downwardly and away from the opening in a continuous loop having a lower edge spaced from the opening, an extrusion face spaced from the opening and extending inwardly in a narrow band from the outside wall at the lower edge of the outside wall;
   heater block means adjacent to said outside wall of the bushing for radiantly and conductively heating the outside wall and the base wall to maintain the temperature of molten glass within the bushing at the desired temperature for fiberizing, said heater block means comprising resistance heating elements disposed about the bushing, said heater block means heating the extrusion face across the narrow band;

a plurality of tips formed in the extrusion face of the bushing through which molten glass is drawn to form glass filaments, said tips each defining a hole through said extrusion face and extending slightly below said extrusion face; and cooling means for cooling the glass filaments upon exiting said tips.

12. The fiberizing bushing assembly of claim 1 wherein said cooling means comprises a pair of metal fins attached to the frame, each of said fins being adjacent said extrusion face.

13. The fiberizing bushing assembly of claim 12 wherein said cooling means further comprises a pair of recirculating water tubes each being secured to one of said fins.

14. A bushing placed over an opening in the forehearth of a glass furnace for forming fiberglass filaments, said bushing comprising a sheet metal blank drawn into a recessed configuration having a planar perimeter flange adapted to be clamped against the bottom of the opening in the forehearth, a base wall within said perimeter flange, an outer wall depending from said perimeter flange and forming at the bottom thereof an extrusion face in the form of a narrow band bound on one side by said outer wall and on a second side by said base wall, said extension face being disposed in a plane substantially parallel to the plane of said perimeter flange, said extrusion face having a plurality of holes therein, each hole being defined by an annular tip depending sufficiently from said extrusion face to insure that glass does not wet over the surface of said extrusion face, an outer heater block supporting resistance heating elements adjacent to said one side of said band and an inner heater block supporting resistance heating elements adjacent to said second side of said band, said inner and outer heater blocks being controlled to apply heat by radiation and conduction from the exterior of said bushing to molten glass within said bushing.

15. The bushing of claim 14 wherein said sheet metal blank is platinum alloy.

16. The bushing of claim 14 wherein said outer wall and said base wall are substantially oval-shaped.

17. In the bushing of claim 14, an inner wall extending from said base wall to said extrusion face.

18. The bushing of claim 14 wherein said base wall is downwardly sloping.

19. The bushing of claim 14 wherein said extrusion face is circular.

20. A fiberizing bushing assembly for making fiberglass wherein molten glass is heated and supplied through an opening to the fiberizing bushing assembly comprising:

a frame;

a bushing retained by said frame on the opening, said bushing having an outside wall extending generally downwardly and away from the opening in a continuous loop and having a lower edge spaced from the opening, an extrusion face spaced from the opening and extending inwardly in a narrow band from the outside wall at the lower edge of the outside wall;

heater block means adjacent to said outside wall of the bushing for radiantly and conductively heating the outside wall to maintain the temperature of molten glass within the bushing at the desired temperature for fiberizing, said heater block means comprising resistance heating elements disposed about the bushing, said heater block means heating the extrusion face across the narrow band;

a plurality of tips formed in the extrusion face of the bushing through which molten glass is drawn to form glass filaments, said tips each defining a hole through said extrusion face and extending slightly below said extrusion face; and cooling means for cooling the glass filaments upon exiting said tips.

21. The fiberizing bushing assembly of claim 20 wherein said bushing has an inner wall contiguous with an inner edge of the extrusion face and extending upwardly from said extrusion face to a base wall at an interior upper edge of the inner wall.

22. The fiberizing bushing assembly of claim 21 wherein said outside wall, said extrusion face, said inner wall, and said base wall of said bushing each have two substantially semi-circular ends and two substantially straight sides.

23. The fiberizing bushing assembly of claim 21 wherein said outside wall, said extrusion face, said inner wall, and said base wall are formed with a substantially uniform thickness from a single sheet of metal.

24. The fiberizing bushing assembly of claim 20 wherein said ceramic members are held in place by said frame, said ceramic members having slots formed therein in which resistance heating elements are disposed, said heater elements being encapsulated in said slots by ceramic filter material.

25. The fiberizing bushing assembly of claim 24 wherein said ceramic members are separately serviceable and individually temperature controlled.

26. The fiberizing bushing assembly of claim 25 wherein said outer module is an oval shaped member having a plurality of heating elements extending substantially completely around the outer module in an oval path, said heating elements being arrayed in a vertically spaced relationship.

27. A bushing placed over an opening in a glass melting apparatus for forming fiberglass filaments, said bushing comprising a sheet metal blank drawn into a recessed configuration having a perimeter flange adapted to be clamped against the bottom of the opening in the glass melting apparatus, an outer wall depending from said perimeter flange and forming at the bottom thereof an extrtusion face in the form of a narrow band bounded on one side by said outer wall, said extrusion face being disposed in a plane substantially parallel to the plane of said perimeter flange, said extrusion face having a plurality of holes therein, each hole being defined by an annular tip depending sufficiently from said extrusion face to insure that glass does not wet over the surface of said extrusion face, a heater block supporting resistance heating elements adjacent to said one side of said band said heater block being controlled to apply heat by radiation and conduction from the exterior of said bushing to molten glass within said bushing.

28. The bushing of claim 27 wherein said outer wall and said base wall are substantially oval.

29. The bushing of claim 27 wherein said outer wall and said base wall are substantially round.

30. The bushing of claim 27 wherein said outer wall and said base wall are substantially rectangular.

31. The bushing of claim 27 wherein said extrusion face is circular.

* * * * *